United States Patent
Pega et al.

(10) Patent No.: US 9,772,429 B2
(45) Date of Patent: Sep. 26, 2017

(54) FLUORINE-DOPED STANNIC OXIDE COLLOIDS AND METHOD FOR PREPARING SAME

(71) Applicants: ESSILOR INTERNATIONAL (COMPAGNIE GENERALE D'OPTIQUE), Charenton le Pont (FR); SHANGHAI UNIVERSITY, Shanghai (CN)

(72) Inventors: Stephanie Pega, Charenton le Pont (FR); Jian Zhao, Singapore (SG); Liyi Shi, Shanghai (CN); Shuai Yuan, Shanghai (CN); Zhuyi Wang, Shanghai (CN); Yin Zhao, Shanghai (CN)

(73) Assignees: ESSILOR INTERNATIONAL (COMPAGNIE GENERALE D'OPTIQUE), Charenton le Pont (FR); SHANGHAI UNIVERSITY, Shanghai (CN)

( * ) Notice: Subject to any disclaimer, the term of this patent is extended or adjusted under 35 U.S.C. 154(b) by 0 days.

(21) Appl. No.: 14/891,109

(22) PCT Filed: May 14, 2013

(86) PCT No.: PCT/CN2013/075609
§ 371 (c)(1),
(2) Date: Nov. 13, 2015

(87) PCT Pub. No.: WO2014/183265
PCT Pub. Date: Nov. 20, 2014

(65) Prior Publication Data
US 2016/0091638 A1   Mar. 31, 2016

(51) Int. Cl.
*G02B 1/00* (2006.01)
*G02B 1/16* (2015.01)
*C01G 19/02* (2006.01)
*G02B 1/04* (2006.01)

(52) U.S. Cl.
CPC ............. *G02B 1/16* (2015.01); *C01G 19/02* (2013.01); *G02B 1/041* (2013.01); *C01P 2002/50* (2013.01); *C01P 2002/54* (2013.01); *C01P 2004/04* (2013.01); *C01P 2004/64* (2013.01); *C01P 2006/22* (2013.01)

(58) Field of Classification Search
CPC ......... G02F 1/133512; G02F 1/133553; G02F 1/133514; G02F 1/167; G02B 1/16; G02B 1/041; C01G 19/02; G09G 3/34
USPC ........................................................ 359/507
See application file for complete search history.

(56) References Cited

U.S. PATENT DOCUMENTS

2007/0182706 A1* 8/2007 Cassidy ............... G02B 5/0808
                                                    345/107
2013/0250398 A1* 9/2013 Takanashi ............ G02F 1/167
                                                    359/296

FOREIGN PATENT DOCUMENTS

| CN | 101580270 A | 11/2009 |
|----|-------------|---------|
| CN | 101638772 A | 2/2010 |
| CN | 101857379 A | 10/2010 |
| JP | 2005221984 | 8/2005 |
| WO | WO2010/015780 | 2/2010 |
| WO | WO2010/109154 | 9/2010 |

OTHER PUBLICATIONS

Chou et al., "Enhanced Light-Conversion Efficiency of Titaniumdioxide Dye-Sensitized Solar Cells with the Addition of Indium-Tin-Oxide and Fluorine-Tin-Oxide Nanoparticles in Electrode Films", Journal of Nanophotonics, 2(023511), 2008, pp. 1-11.
Wu et al., "Preparation, Characterization and Electrical Properties of Flourine-doped Tin Dioxide Nanocrystals", Journal of Colloid and Interface Science 346, 2010, pp. 12-16.
Kumar et al., "Optical and Photocatalytic Properties of Heavily F-Doped $SnO_2$ Nanaocrystals by a Novel Single-Source Precursor Approach", Inorganic Chemistry, 50, 2011, pp. 5637-5645.

* cited by examiner

*Primary Examiner* — Euncha Cherry
(74) *Attorney, Agent, or Firm* — Norton Rose Fulbright US LLP

(57) ABSTRACT

A method for producing a colloidal alcoholic suspension of fluorine-doped $SnO_2$ particles. It also pertains to the colloidal suspension thus obtained and to its uses, especially in the manufacture of an antistatic coating for an optical article, such as an ophthalmic lens.

20 Claims, No Drawings

FLUORINE-DOPED STANNIC OXIDE COLLOIDS AND METHOD FOR PREPARING SAME

CROSS-REFERENCE TO RELATED APPLICATIONS

This application is a national phase application under 35 U.S.C. §371 of International Application No. PCT/CN2013/075609 filed 14 May 2013, the entire contents of which is specifically incorporated herein by reference without disclaimer.

FIELD OF THE INVENTION

The present invention pertains to a method for producing a colloidal alcoholic suspension of fluorine-doped $SnO_2$ particles. It also pertains to the colloidal suspension thus obtained and to its uses, especially in the manufacture of an antistatic coating for an optical article, such as an ophthalmic lens.

BACKGROUND OF THE INVENTION

Optical articles typically comprise a transparent optical substrate coated with an optional primer, an abrasion-resistant coating (or hard-coat) and possibly other layers such as an anti-reflection coating.

These optical articles are usually made of substantially insulating materials and tend to have their surface becoming easily charged with static electricity, particularly when cleaned under dry conditions by rubbing their surface with a wiping cloth, a piece of synthetic foam or of polyester. This phenomenon is called triboelectricity. Charges present on the surface thereof do create an electrostatic field able of attracting and retaining dust particles.

In order to counter this phenomenon, it is necessary to reduce the electrostatic field intensity, that is to say to reduce the number of static charges present on the article surface. This may be done by inserting into the stack of layers of the optical article a layer of a conducting material which dissipates the charges, also called an "antistatic coating".

Such an antistatic coating may form the outer layer of the stack, or an intermediate layer thereof. For instance, it may be directly deposited onto the transparent optical substrate.

A typical antistatic material is TCO (transparent conductive oxide), which refers to an important class of photoelectric materials providing both electrical conductivity and optical transparency.

TCO materials can be divided into n-type (electron is charge carrier) and p-type (hole is charge carrier) materials. N-type TCO materials includes the Cd, In, Sn or Zn oxides or multiple complex oxides, which may be doped. Tin doped $In_2O_3$ (ITO) and antimony or fluorine doped $SnO_2$ (respectively ATO and FTC), are among the most utilized TCO thin films in modern technology. In particular, ITO is used extensively for industrial applications. Recently, the scarcity and price of Indium needed for ITO has motivated industrial companies to find a substitute such as ATO, which has a lower cost than ITO. It has thus been suggested to use ATO for forming electrostatic coatings in optical articles (WO 2010/109154, WO 2010/015780). However, ATO has comparatively a lower conductivity and also a higher absorption in the visible light range than ITO. Consequently, ATO layers have limited transparency compared to ITO and a slightly blue coloration together with poorer conductivity. As another ITO potential substitute, FTO presents the advantage to be more conductive than ATO and have a higher transparency than ATO in the visible range (less absorption). Compared with other TCO materials, the FTO materials show also higher thermal stability, higher mechanical and chemical durability and lower toxicity.

TCO layers for industrial applications are commonly produced by PVD (Physical Vapor Deposition) (US 2012/295087). This method requires important investments in terms of production equipments (cost and space). Academic articles also report chemical deposition processes leading to ITO, ATO or FTO layers (J. Sol-Gel Sci. Technol., 2010, 53: 316-321; ACS Appl. Mater. Interfaces, 2012, 4(5): 2464-2473). However, these processes are starting from precursor solutions deposited on the substrate and drastic post-treatments like high temperature (around 600° C.) treatments are needed to obtain the crystalline TCO layer. These processes cannot be applied to plastic substrates, such as optical substrates, that are sensitive to temperature upper than 120° C. In view of the above, it would rather be desirable to be able to produce FTO layers at mild temperature, by wet deposition techniques, such as spin or dip-coating of FTO crystalline nanoparticles dispersed in a liquid. In particular, to be able to form very thin films (<100 nm) on the lenses or to introduce them in typical sol-gel formulations used for the formation of optical hard-coats, these particles should be able to be dispersed in alcoholic solvents.

The inventors have shown that such FTO layers could be prepared from a colloidal suspension of FTO obtained by a process comprising the steps of mixing tin and fluorine specific precursors and subjecting same to hydrothermal treatment. A similar process has already been described in CN101580270, wherein fluoride inorganic salts and tin nitrate, sulfate or chloride are used as fluorine and tin precursors, respectively. These precursors are mixed in water at a pH of 6-8 in the presence of H2O2 before subjecting them to hydrothermal treatment. The colloidal suspension obtained is then purified by ultrafiltration. However, colloids prepared according to CN101580270 are provided in an aqueous medium and cannot be stably dispersed in an alcoholic medium after solvent exchange. Moreover, they show quite high sheet resistance (higher than 100 Ω/square), which restricts their application. Finally, this process requires lengthy purification steps to eliminate the chloride ions used in large amounts, which negatively impacts the economics of this process.

Therefore, there remains the need to provide a simple process for preparing a stable colloidal suspension of fluorine-doped stannic oxide crystals in an alcoholic medium, which allows the formation of a thin, transparent and conductive film.

After conducting extensive research, the present inventors have demonstrated that this need could be satisfied by subjecting a mixture comprising a specific type of organic fluorine precursor and stannous oxalate to hydrothermal treatment.

SUMMARY OF THE INVENTION

An object of this invention is drawn to a method for producing a colloidal alcoholic suspension of fluorine-doped stannic oxide particles, comprising the following successive steps:

a) preparing a mixture comprising stannous oxalate, a quaternary ammonium fluoride salt, hydrogen peroxide and an acid, in a solvent consisting of deionized water optionally mixed with at least one alcohol, b) subjecting said mixture to hydrothermal treatment, so as to obtain a suspension,
c) desalting said suspension, and
d) optionally subjecting said desalted suspension to a solvent-exchange step with at least one alcohol.

Without being bound by this theory, it has been assumed that the specific fluorine precursor used in the above process works not only as the dopant, but also performs as a surface stabilizer during the formation of stannic oxide particles, so as to inhibit the growth of FTO nanocrystals and prevent their sedimentation. Moreover, the tin precursor used does not contain any chloride ions, which facilitates the purification or desalting step.

Another object of this invention is drawn to a transparent colloidal suspension of fluorine-doped stannic oxide particles, characterized in that it comprises fluorine-doped stannic oxide particles in an alcoholic medium, in a dry matter content of at least 5% by weight and preferably of at least 10% by weight, and that it has a zeta potential of more than 30 mV, in absolute value. This suspension may be obtained according to the process mentioned above.

A further object of this invention is drawn to the use of the above colloidal suspension in the manufacture of an antistatic coating for an optical article, such as an ophthalmic lens.

A further object of this invention pertains to an optical article, such as an ophthalmic lens, comprising a transparent polymer substrate and at least one coating prepared from a composition comprising the above colloidal suspension.

The colloidal suspension of this invention indeed allows the formation of an antistatic coating which is characterized by a decay time of less than 500 ms, when measured as disclosed in the following Examples, and which does not substantially impair the transparency of the optical article.

DETAILED DESCRIPTION OF THE INVENTION

As mentioned above, the present invention is drawn to a method for producing a colloidal alcoholic suspension of fluorine-doped stannic oxide particles.

In the first step of this method, stannous oxalate is used as a precursor of stannic oxide. The inventors have shown that other tin precursors were not suitable in the above process. Specifically, they found that stannic chloride, which is the most commonly used precursor of tin, led to colloid particles that appeared to be aggregated and that could not be re-dispersed suitably in water. Moreover, the chloride ions seemed to act as competitors for the fluoride ions and prevent effective doping of stannic oxide. Moreover, stannous sulphate was found to react with water and precipitate as $Sn_2(OH)_2SO_4$.

Stannous oxalate may optionally be formed in situ, i.e. before conducting the first step of this process, by reacting tin with oxalic acid. In any case, stannous oxalate is dissolved in a solvent in the presence of hydrogen peroxide which aids in this dissolution by forming a tin complex, in addition to provide an oxygen source for the formation of stannic oxide. The amount of hydrogen peroxide should nonetheless be low enough, so as not to impede stannic oxide doping. The molar ratio of hydrogen peroxide to tin ranges from 0.5:1 to 4:1, preferably from 0.5:1 to 1.5:1 and is more preferably of 1:1.

The solvent is needed to dissolve properly the fluorine precursor and thus to obtain proper nucleation and growth of the fluorine-doped stannic oxide particles, which in turn have consequences on the size, the dispersion state and the doping ratio of these particles. This solvent consists in deionized water preferably mixed with at least one alcohol which may be selected from the group consisting of methanol, ethanol, n-propanol, isopropanol, n-butanol, 1-methoxy-2-propanol and their mixtures, preferably isopropanol. In the case of an hydro-alcoholic solvent, the volume ratio of alcohol to deionized water in the hydro-alcoholic solvent ranges from 1:12 to 1:4, preferably from 1:8 to 1:4.

This step is also conducted in the presence of an acid other than hydrochloric acid, such as oxalic acid and/or nitric acid, which allows obtaining a good dissolution of the precursor.

Stannous oxalate is reacted with a quaternary ammonium fluoride salt. Quaternary ammonium compounds are a group of ammonium salts in which the central nitrogen atom of the ammonium cation is linked to four organic radicals. The organic radicals may be independently chosen from an alkyl, aryl, or aralkyl group, for instance, and the nitrogen can be part of a ring system. The choice of this fluorine precursor is also critical in order to inhibit the growth of the fluorine-doped stannic oxide crystals and to obtain well dispersed colloidal particles that do not aggregate. Such dispersion could not be obtained using $NH_4F$, NaF or KF as fluorine precursors. The quaternary ammonium fluoride salt may be selected from the group consisting of $(C_2H_5)_4NF$, $(C_3H_7)_4NF$, $(C_4H_9)_4NF$ and their mixtures, preferably $(C_4H_9)_4NF$ or $(C_3H_7)_4NF$. The molar ratio of fluorine to tin may range from 0.1:1 to 3:1 and preferably from 0.5:1 to 2:1.

The mixture used in step (a) preferably does neither contain any chloride ions, nor any stabilizer such as PVP. This mixture is then subjected to a hydrothermal treatment, which may be conducted in an autoclave, for instance during 6 to 72 hours and preferably from 20 to 30 hours, at a temperature of 120 to 220° C., preferably from 160 to 200° C.

This hydrothermal treatment results in a transparent, dark green suspension of fluorine-doped stannic oxide particles. This suspension is then desalted by any appropriate means, such as by dialysis or by ultrafiltration. In the case where desalting is performed by ultrafiltration, the suspension is preferably diluted beforehand. If it is performed by dialysis, an alcoholic solvent such as ethanol or methanol is preferred used.

The process of this invention may include a further step of solvent exchange with at least one alcohol, which may be ethanol or methanol. This step is intended to substitute this alcoholic solvent for part, or preferably all, of the aqueous solvent contained in the suspension. Solvent exchange may be performed by any means, such as by dialysis or diafiltration.

Therefore, the solvent-exchange step may be omitted in the case where the desalting step is performed by dialysis with an alcohol such as ethanol or methanol.

Other process steps may be performed either before, between or after those mentioned above, provided that they do not impair the effective dispersion of the colloidal particles. Preferably, a step of ultrasonic treatment may be performed after formation of the colloidal suspension of this invention and/or before the solvent-exchange step, so as to disperse the precipitate which may form during hydrothermal treatment. In addition or alternatively, a subsequent step of pH adjustment may be performed by addition of an acid or a base to the suspension.

The process described above may also comprise a step of concentration of the suspension obtained either before of after the solvent-exchange step, in order to increase its dry matter content. The suspension may be concentrated, for instance, by evaporation or preferably by ultrafiltration, in order to obtain a colloidal suspension of fluorine-doped stannic oxide nanoparticles with a solids content ranging from 5 to 20% by weight and preferably from 8 to 15% by weight.

The method of this invention results in a transparent colloidal alcoholic suspension of fluorine-doped stannic oxide particles, which has a zeta potential of more than 30 mV, preferably of more than 40 mV and more preferably of more than 50 mV, in absolute value, which reflects the high dispersion of the particles. This high zeta potential is still measured after 60 days of storage at room temperature. The high dispersion of the suspension obtained according to this invention may also be observed by transmission electron microscopy (TEM) and UV-Visible spectroscopy (which shows no sedimentation).

This suspension may have a pH between 2 and 11. Furthermore, its viscosity is preferably below 10 cPs, as measured at 25° C. with a Brookfield Viscosimeter DV-C with UL adapter.

Preferably, the colloidal particles have a nanocrystal size ranging from 10 to 15 nm, as calculated from XRD data and/or a particle size, as measured by dynamic light scattering (DLS) of less than 100 nm and preferably less than 30 nm.

The sheet resistance of these nanoparticles is usually less than 100 Ω/square, and typically less than 80 Ω/square or even less than 60 Ω/square, as measured after drying at 100° C. and forming the solid thus obtained into a tablet.

This suspension of fluorine-doped stannic oxide particles may then be used in the manufacture of an antistatic coating for an optical article such as an ophthalmic lens.

The optical article may comprise a transparent polymer substrate, which may be a thermoplastic resin such as thermoplastic polycarbonate derived from bisphenol A, polyurethane and homo- and copolymers of (meth)acrylate, or a thermoset or photo-cured resin, which may be obtained by polymerization of allyl carbonates of linear or branched aliphatic or aromatic polyols such as diethylene glycol bis(allyl carbonate) (CR 39®). This substrate may be subjected to any chemical or physical treatment intended to activate its surface, such as by corona or plasma treatment.

A primer may be applied onto the substrate, for instance by dip coating or spin coating. This primer usually has a thickness of from 0.05 to 20 μm, for instance from 0.5 to 5 μm. It may be chosen from organic latex materials having a particle size of less than 50 nm and preferably less than 20 nm. These materials may be selected from polyurethanes and poly(meth)acrylic compounds such as copolymers of alkyl(meth)acrylates and styrene. The primer is usually dried after coating, at a temperature which may range from 70 to 100° C. for 2 minutes to 2 hours.

The optical article also generally includes a hard-coat or abrasion-resistant coating which is applied directly to the substrate or preferably onto the primer. This coating is generally prepared from a composition comprising at least one alkoxysilane and/or a hydrolysate thereof and optionally a catalyst. Its thickness may range from 1 to 15 μm, preferably from 2 to 10 μm and more preferably from 3 to 5 μm. After drying, the hard-coat is cured thermally or by irradiation.

This hard-coat may be coated with other layers such as an anti-reflection coating, which may be a mono- or multilayer film comprising dielectric materials such as SiO, $SiO_2$, $TiO_2$, $ZrO_2$, $Al_2O_3$, $MgF_2$, $Ta_2O_5$ or mixtures thereof.

The colloidal suspension of this invention may be introduced into the formulation of the hard-coat.

Alternatively, the colloidal suspension of this invention may be included in the formulation of a coating which may be either interposed between two layers of the stack forming the optical article or applied on the external side of this stack, starting from the substrate. Preferably, the colloidal suspension of this invention is directly applied onto the optical substrate. Such antistatic coating composition may be applied, for instance by dip coating or spin coating, and then dried to a thickness of from 0.1 to 150 nm, for instance from 1 to 80 nm.

Besides the colloidal suspension of this invention, the antistatic coating may comprise at least one binder, such as a polyurethane latex, and/or colloidal particles of a non-conductive mineral oxide, such as $SiO_2$.

In any case, it is thus possible to obtain an optical article, such as an ophthalmic lens, comprising a transparent polymer substrate and at least one antistatic coating prepared from an antistatic composition comprising the colloidal suspension described above.

EXAMPLES

This invention will be further illustrated by the following non-limiting examples which are given for illustrative purposes only and should not restrict the scope of the appended claims.

Example 1: Preparation of a Fluorine-Doped Stannic Oxide Colloid 4.962 g (0.024 mol) of stannous oxalate powder and 3.026 g (0.024 mol) of oxalic acid dihydrate (molar ratio=1:1) were added in a 60 ml mixture solvent of deionized water and propanol (volume ratio=5:1). 2.721 g (0.024 mol) of $H_2O_2$ (30 wt. % solution) was then added to this solution at room temperature for one hour under stirring to form a clarified solution. As the dopant, 3.786 g (0.012 mol) of $(C_4H_9)_4NF$ trihydrate was then introduced in a molar ratio of F to Sn of 0.5:1. Hydrothermal treatment was carried out in a 100 ml Teflon-lined autoclave at a temperature of 180° C. for 25 hours. The product was then treated by ultrasound in an ice-water bath for one hour and then subjected to dialysis in ethanol in order to remove the impurities and exchange the solvent. At last, the product was concentrated to 12 wt. % dry content by ultrafiltration with a Vivaflow® 200 membrane (SARTORIUS) to obtain an ethanol-based FTO colloid.

Example 2: Characterization of the Colloid

The stability of the colloid of Example 1 was assessed by measuring its zeta potential with a Zetasizer® 3000HS (MALVERN INSTRUMENTS Ltd.) on the fifth day following its preparation. Its zeta potential was −58.5 mV, indicating the high stability of the suspension. After 60 days at room temperature, its zeta potential was still above 30 mV in absolute value (−37.3 mV), and the colloid remained dark green and transparent. This reflects the high dispersion of the particles, which was confirmed by its UV-Vis spectra.

Moreover, the particle size distribution was measured by DLS on the product of Example 1, after dilution at 0.5 wt. %, using the Zetasizer® 3000HS (MALVERN INSTRUMENTS Ltd.). The particle size was comprised between 20.2 and 25.1 nm, indicating a uniform size distribution.

The colloid of Example 1 was also dried at 110° C. in order to characterize the nanoparticles in the form of a solid powder.

Powder crystallinity was analyzed by XRD. The diffractogram showed that these nanoparticles had a pure rutile $SnO_2$ crystalline phase with high crystallinity.

The approximate crystallite sizes of the fluorine-doped tin oxide were calculated by the Scherrer formula according the full width at half maximum (FWHM) of the (110) peak. The nanoparticles synthetized from example 1 had a crystallite size of around 11 nm.

The powder was then pressed into a tablet by means of a tablet machine FY-24, and sheet resistance was measured using a RTS-8, 4-point probe resistivity measurement system. The sheet resistance had a value of 55 Ω/square and the conductivity calculated therefrom was equal to $5.70\times10^{-2}$ S/cm. Its resistivity was 17.5 Ω·cm, as measured with the same equipment.

Example 3: Use as an Antistatic Agent

Lenses based on thermoset polyurethane sold by MITSUI were used as optical substrates.

After cleaning the lenses, the colloidal suspension of Example 1 was first diluted at 3 wt. % dry content and then deposited by spin-coating on the convex side of the lenses. The lenses were then dried at ambient temperature for at least 5 minutes. They were then successively coated, by dip coating, with one of two types of bilayer coatings (HC1 and HC2, respectively), each consisting of a primer and a hard-coat. The primers and hard coats were pre-cured at 75° C. during 15 minutes. After pre-curing, the lenses were subjected to polymerization during 3 hours at 100° C.

For the sake of comparison, additional lenses were prepared, which either were not coated with the colloid of this invention, or were coated with a commercial ATO conductive colloid (Elcom V3560 supplied by JGC), diluted at 3 wt. % in ethanol, instead of the FTO colloid of this invention.

Moreover, silicon wafers were coated in the same conditions with a TCO Layer. The thickness of the FTO coating, measured by means of an ellipsometer equipped with a 633 nm laser, was 68-69 nm. The thickness of the TCO coating on the ophthalmic substrate used in these experiments is consider similar.

The antistatic performance was assessed by means of charge-discharge experiments. The charge decay times of the lenses have been measured at 25° C. with a JCI 155 (John Chubb Instrumentation) equipment, following the instructions provided by the supplier, after submitting the lenses to a corona discharge treatment of −9000 V during 30 ms. The decay time corresponds to the time needed to reach 36.7% of the maximum tension measured at the surface of the lenses. A lens is regarded as "antistatic" if its decay time is under 500 ms.

The transmission level of the lens was also measured according to the ISO Standard 8980-3, in the 380 nm-780 nm wavelength range, using a spectrophotometer (CARY 50). It corresponds to the transmission factor as defined in the ISO Standard 13666:1998.

The results of these experiments are summarized in the table below.

| Lens | Bilayer coating | Tv | Decay time |
|---|---|---|---|
| w/o TCO colloid | HC1 | 92.1% | >30 s |
| w/FTO colloid | HC1 | 92.0% | <500 ms |
| w/ATO colloid | HC1 | 91.5% | <500 ms |
| w/o TCO colloid | HC2 | 89.2% | >3 s |
| w/FTO colloid | HC2 | 89.3% | <500 ms |
| w/ATO colloid | HC2 | 88.6% | <500 ms |

As can be seen from this table, the colloid of this invention and the conventional ATO colloid provide for comparable antistatic properties. However, the colloid of this invention does not impair the transparency of the coated lens, contrary to the conventional colloid.

Further experiments have shown that this difference between the FTO and ATO coatings is even more drastic when the total TCO thickness is higher, i.e. when the colloid is applied by dip-coating on both sides of the lens up to a total thickness of 140-142 nm.

The invention claimed is:

1. A method for producing a colloidal alcoholic suspension of fluorine-doped stannic oxide particles, comprising the following successive steps:
   a) preparing a mixture comprising stannous oxalate, a quaternary ammonium fluoride salt, hydrogen peroxide and an acid, in a solvent consisting of deionized water optionally mixed with at least one alcohol,
   b) subjecting said mixture to hydrothermal treatment, so as to obtain a suspension,
   c) desalting said suspension, and
   d) optionally subjecting said desalted suspension to a solvent-exchange step with at least one alcohol.

2. The method according to claim 1, wherein the solvent consists in a mixture of deionized water with at least one alcohol selected from the group consisting of methanol, ethanol, n-propanol, isopropanol, n-butanol, 1-methoxy-2-propanol and their mixtures.

3. The method according to claim 2, wherein the volume ratio of alcohol to deionized water in the solvent ranges from 1:12 to 1:4.

4. The method according to claim 1, wherein the quaternary ammonium fluoride salt is selected from the group consisting of $(C_2H_5)_4NF$, $(C_3H_7)_4NF$, $(C_4H_9)_4NF$ and their mixtures.

5. The method according to claim 1, wherein the molar ratio of hydrogen peroxide to tin ranges from 0:1 to 4:1.

6. The method according to claim 1, wherein the molar ratio of fluorine to tin ranges from 0.1:1 to 3:1.

7. The method according to claim 1, wherein the acid used in step (a) is an acid other than hydrochloric acid, such as oxalic acid and/or nitric acid.

8. The method according to claim 1, wherein the hydrothermal treatment is conducted at a temperature ranging from 120 to 220° C. for a period of time ranging from 6 to 72 hours.

9. The method according to claim 1, wherein the desalting step is performed by dialysis or ultrafiltration.

10. The method according to claim 1, wherein the solvent-exchange step is performed by dialysis or diafiltration.

11. The method according to claim 1, wherein it further includes a step of ultrasonic treatment after formation of the colloidal suspension and/or before the solvent-exchange step and/or a step of pH adjustment by addition of an acid or base.

12. A transparent colloidal alcoholic suspension of fluorine-doped stannic oxide particles, which has a zeta potential of more than 30 mV, in absolute value.

13. The colloidal suspension of claim 12, wherein the particles have a nanocrystal size ranging from 10 to 15 mV.

14. An antistatic coating for an optical article, such as an ophthalmic lens, comprising the colloidal suspension according to claim 12.

15. An optical article, such as an ophthalmic lens, comprising a transparent polymer substrate and at least one coating prepared from a composition comprising the colloidal suspension according to claim 12.

16. The method according to claim 2, wherein the volume ratio of alcohol to deionized water in the solvent ranges from 1:8 to 1:4.

17. The method according to claim 1, wherein the molar ratio of hydrogen peroxide to tin ranges from 0.5:1 to 1.5:1.

18. The method according to claim 1, wherein the molar ratio of hydrogen peroxide to tin is 1:1.

19. The method according to claim 1, wherein the molar ratio of fluorine to tin ranges from 0.5:1 to 2:1.

20. The method according to claim 1, wherein the hydrothermal treatment is conducted at a temperature ranging from 160 to 200° C., for a period of time ranging from 20 to 30 hours.

* * * * *